(12) United States Patent
Chuang

(10) Patent No.: US 12,061,594 B2
(45) Date of Patent: Aug. 13, 2024

(54) VERIFIED ENTITY ATTRIBUTES

(71) Applicant: Google LLC, Mountain View, CA (US)

(72) Inventor: Wei-Haw Chuang, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 469 days.

(21) Appl. No.: 17/248,720

(22) Filed: Feb. 4, 2021

(65) Prior Publication Data
US 2022/0245124 A1    Aug. 4, 2022

(51) Int. Cl.
| G06F 16/00 | (2019.01) |
| --- | --- |
| G06F 16/23 | (2019.01) |
| G06F 16/951 | (2019.01) |
| G06F 16/953 | (2019.01) |
| G06F 16/958 | (2019.01) |
| H04L 9/40 | (2022.01) |

(52) U.S. Cl.
CPC ........ *G06F 16/2365* (2019.01); *G06F 16/951* (2019.01); *G06F 16/953* (2019.01); *G06F 16/986* (2019.01); *H04L 63/0823* (2013.01)

(58) Field of Classification Search
CPC .... G06F 16/951; G06F 16/986; G06F 16/953; G06F 16/2365; H04L 63/0823
See application file for complete search history.

(56) References Cited

U.S. PATENT DOCUMENTS

| 8,260,774 | B1* | 9/2012 | Aggarwal | ............. | G06F 16/951 |
| --- | --- | --- | --- | --- | --- |
| | | | | | 707/723 |
| 2004/0064334 | A1* | 4/2004 | Nye | .................... | G06F 16/9537 |
| | | | | | 705/317 |
| 2006/0129804 | A1* | 6/2006 | Satkunanathan | ... | H04L 63/0823 |
| | | | | | 713/175 |
| 2006/0236337 | A1* | 10/2006 | Zoller | ..................... | G06F 9/451 |
| | | | | | 725/38 |
| 2011/0093347 | A1* | 4/2011 | Lindblom | .............. | G06Q 30/02 |
| | | | | | 709/206 |
| 2020/0251111 | A1* | 8/2020 | Temkin | ................... | G10L 15/22 |
| 2022/0092168 | A1* | 3/2022 | Brown | .................... | G06F 21/44 |

OTHER PUBLICATIONS

Lynch, Clifford A. "When documents deceive: Trust and provenance as new factors for information retrieval in a tangled web." Journal of the American Society for information science and technology 52.1 (2001): 12-17.*
Cappiello, Cinzia, et al. "Representation and Certification of Data Quality on the Web." ICIQ. 2004.*
""Pilot" Guidelines for Issuance of Verified Mark Certificates", Version 0.985, May 26, 2020, 16 pages.
"Schema.org", V11.01, retrieved on Feb. 4, 2021, 1 page.
"Semantic Web", Wikipedia, Jan. 24, 2021, 15 pages.

* cited by examiner

*Primary Examiner* — Nan Hutton
(74) *Attorney, Agent, or Firm* — Brake Hughes Bellermann LLP

(57) ABSTRACT

Systems and methods enable an entity to certify a web page address as being linked to the entity. The web page address includes semantic web mark-up identified attributes for the entity. A system may extract the attributes from the web page for the entity and use the attributes to generate an information card for the entity. The certification process ensures that the attributes are accurate, so that information cards generated for the entity are of high quality and reliable. Implementations may also simplify maintenance and quality assurances processes for an entity repository.

17 Claims, 4 Drawing Sheets

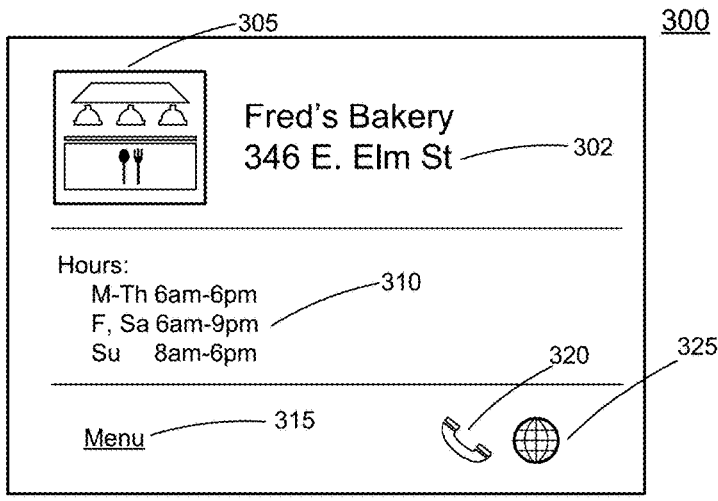
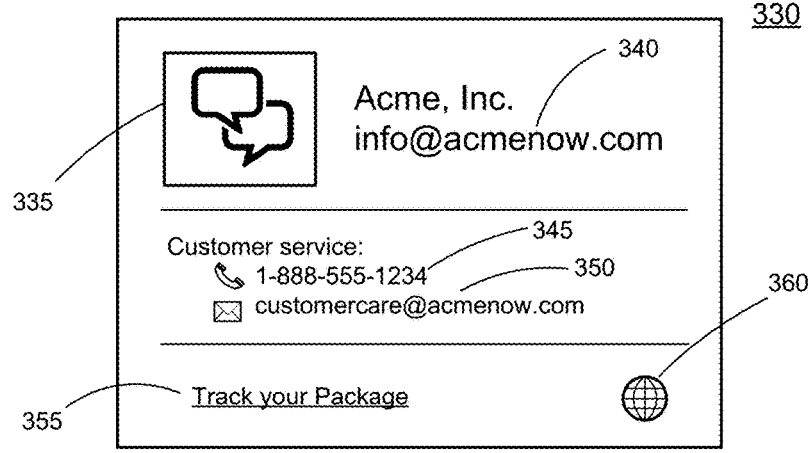
FIG. 3
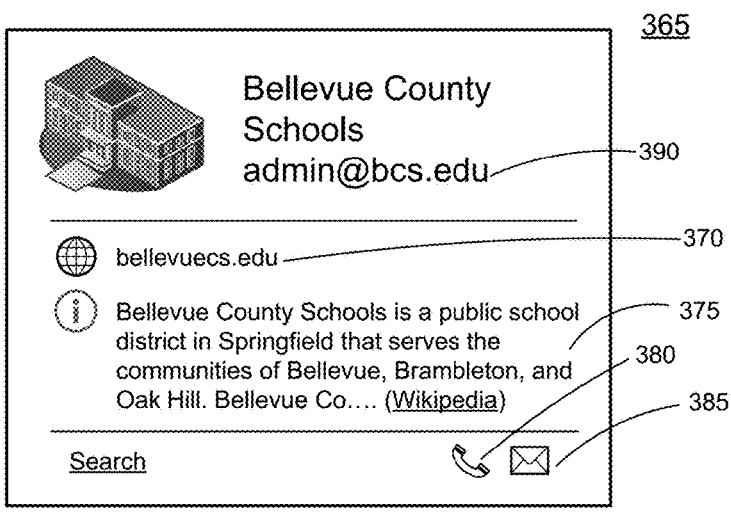

VERIFIED ENTITY ATTRIBUTES

BACKGROUND

Entities are people, places, or things that users may want more information about. For example, a user may want to know how to call a company, how late a store stays open, how to reach out to a social connection, etc. Entities are commonly associated with attributes, e.g., information that describes different aspects of the entity. Many entity attributes are available via web pages, but the accuracy and validity of the attributes is not always apparent. Additionally, many entities can be referred to by the same word or words (e.g., jaguar may refer to a car, an animal, a sports team, etc.). An entity repository stores information (e.g., attributes or facts) about entities and can be used to provide answers to queries about entities. Some web pages use semantic web semantic web markup to identify attributes about an entity to make extraction of entity attributes easier, but the semantic web semantic web markup does not assure that the entity certifies the accuracy of what is marked.

SUMMARY

Implementations provide a system that enables an entity, such as a business, an organization, a person, a political campaign, etc., to certify a web page or web pages as a trusted source of attributes for the entity. The web page may use semantic web markup to identify the attributes. The system may include a certificate system that verifies information associated with the real-world entity. In some implementations, the certificate system may include human review and verification of information purported to be associated with the entity. Once verified, the certificate system may issue a certificate that provides an assurance that information in the certificate has been verified as associated with the entity and, therefore, is trustworthy. A web page address may be included in the information included in the certificate. The web page address may represent a single web page or multiple web pages. Multiple web pages may arise when explicitly specified in a certificate with, e.g., a link describing a purpose, when web pages are implicitly specified in a directory, or when web pages are implicitly specified under a DNS sub-domain. In some implementations, the certificate may verify a user has selected certain elements as sharable. A system may request a certificate for a particular entity and may use a web page identified in the certificate to obtain attributes for the entity from the web page. Because the entity has certified that the web page is associated with the entity, and this has been verified, e.g., by an independent certificate authority, the attributes obtained from the web page for the entity can be considered of high reliability. Thus, the system can use those attributes with confidence. The attributes can be used to generate an information card for the entity. Such information cards can be provided in response to a query that relates to the entity or as a pop-up informational window, e.g., a hover card.

One or more of the implementations of the subject matter described herein can be implemented so as to realize one or more of the following advantages. As one example, the certification of a web page as containing accurate attributes for an entity ensures that an information card generated for an entity is accurate and eliminates the need to infer facts. This means that users can rely on the information in the card, improving the user experience. As another example, some implementations provide a level of confidence to consumers of the information card, as an indication of certification can be displayed. As another example, a messaging system may generate an information card with actionable content reproduced from the message in addition to certified attributes for the entity sending the message. As a result, the information card may function as a summary of the message in addition to providing certified attributes likely to be useful to the message recipient, e.g., such as contact information, business hours, customer service contact, etc. for following up with the entity. Such an information card can reduce usage of network bandwidth because fewer interactions are needed to obtain the helpful information. As another example, implementations may simplify ranking of search results for an entity, as entities with certified attributes may receive a boost in rank or the certified attributes can receive a boost in rank. As another example, implementations may simplify the maintenance of an entity repository and improve its quality by eliminating the need for many attribute inference, attribute verification, and attribute conflict resolution processes. For example, an indexing engine can crawl a web page certified as describing an entity and may take any attributes obtained from the web page as verified, without further corroboration. Moreover, an attribute value obtained on a recent crawl, which may conflict with earlier crawled values, can be relied upon as accurate and be used to replace the prior value with confidence and without further corroboration.

The details of one or more implementations are set forth in the accompanying drawings and the description below. Other features will be apparent from the description and drawings, and from the claims.

BRIEF DESCRIPTION OF THE DRAWINGS

FIG. 3 illustrates example corporate entity information cards, in accordance with some implementations.

Like reference symbols in the various drawings indicate like elements.

DETAILED DESCRIPTION

Figure 1:
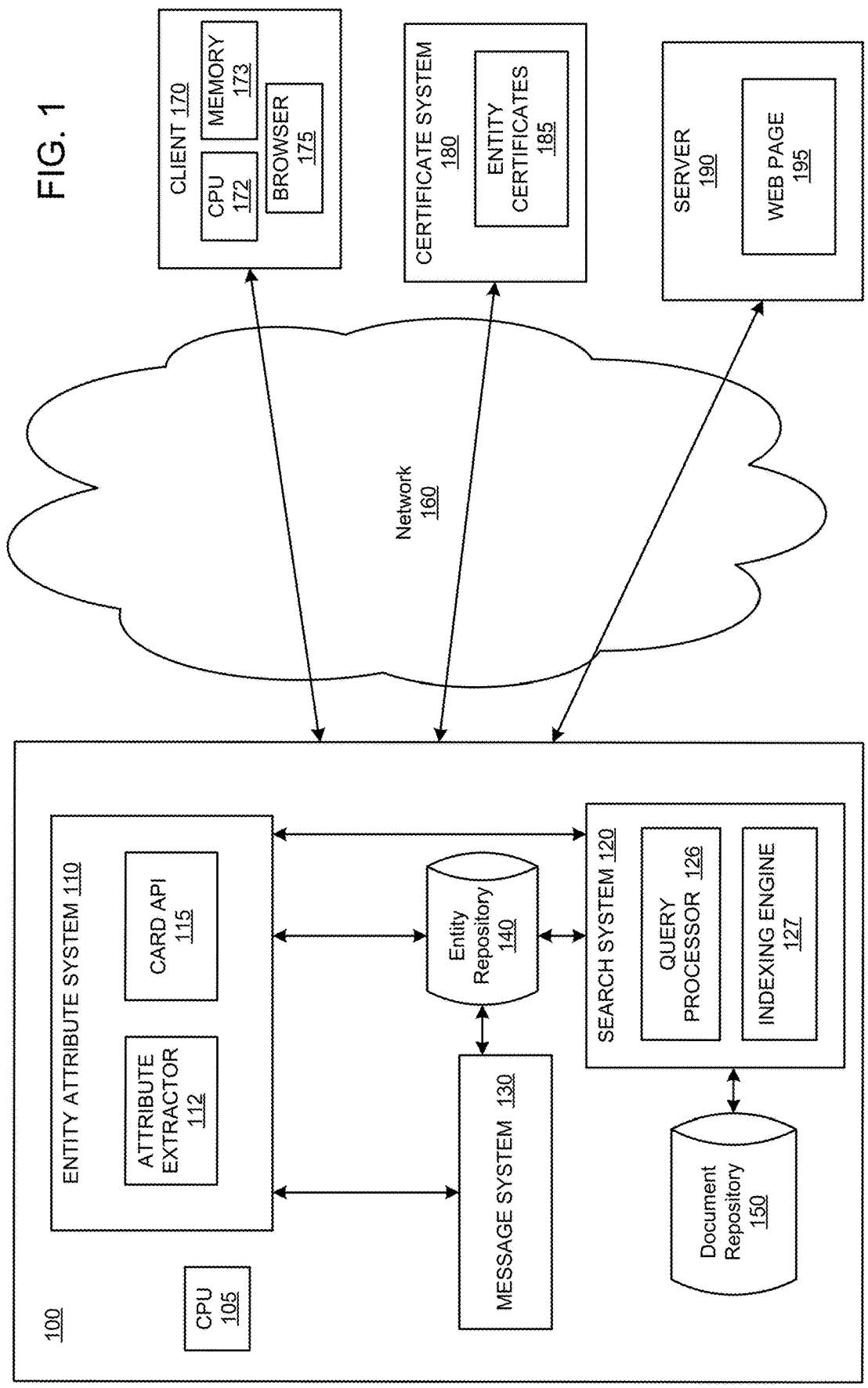
FIG. 1 illustrates an example system in accordance with some implementations.

FIG. 1 is a block diagram of a system 100 in accordance with an example implementation. The system 100 may be used to implement a search engine that provides entity information cards with certified facts as part of search results for a particular query. The system 100 may be used to implement a messaging system that provides information cards for entities. The system 100 may be used to implement other systems (e.g., social media systems, advertising systems, etc.) that provide information cards for entities. The system 100 may be used as a search engine system that provides search results from an Internet corpus and/or an entity repository. In some implementations the search engine may search the entity repository without providing search results from a separate corpus of documents or vice-versa. Other configurations and applications of the described technology may be used. For example, the information cards using certified attributes may be used in marketing tasks, e.g., providing an information card for an ad associated with an entity.

The system 100 may include one or more systems that use or generate the disclosed entity information cards. For example, system 100 may include entity attribute system 110, message system 130, and search system 120. Entity attribute system 110, message system 130, and search system 120 may be computing devices that take the form of a number of different devices, for example a server, a group of such servers, or a rack server system. In some implementations, one or more of entity attribute system 110, message system 130, and search system 120 may be a single system sharing components such as processors 105 and memories.

The system 100 may include an entity repository 140. The entity repository 140 may store facts about entities. The facts may be attributes of an entity or describe relationships between two entities. In some implementations, the entity repository 140 may be graph-based where entities are stored as nodes and facts are stored as relationships between entities or attribute-value pairs for the entities. The edges of such a graph may be labeled edges and a label may represent one of thousands or hundreds-of-thousands of different facts. As used herein, an entity may refer to a physical embodiment of a person, place, or thing or a representation of the physical entity, e.g., text, or other information that refers to an entity. For example, an entity may be a real-world business or an abstract concept that represents the business. In some implementations, the entity repository 140 may include an index to assist in searching for entities.

The search system may also include a document repository 150 that is searchable. For example, document repository 150 may include an index that stores terms or phrases that appear in the documents (e.g., web pages, PDF documents, word documents, images, etc.), as well as the content of the documents or a pointer to the content. In some implementations the document repository 150 represents documents available over the Internet.

The document repository 150 and the entity repository 140 may be stored on a tangible computer-readable storage device, for instance disk, flash, cache memory, or a combination of these, configured to store data in a semi-permanent or non-transient form. In some implementations, document repository 150 and entity repository 140 may be stored in a combination of various memories and either or both can be distributed over one or more servers. In some implementations, document repository 150 and entity repository 140 may be stored at a server remote from system 100 but accessible by system 100.

The system 100 may include entity attribute system 110. The entity attribute system 110 can include modules that, when executed by a processor, such as processor 105, perform certain operations. In some implementations, the modules may be stored in an external storage device (not shown) and loaded into memory. The modules, such as attribute extractor 112 and card API 115, may enable entity attribute system 110 to identify a web page linked to an entity in a certificate, extract attributes about the entity from the web page, and generate an entity information card that includes one or more of the attributes. In some implementations, an entity repository, such as entity repository 140, may be updated with the web page and/or one or more of the attributes extracted from the web page.

For example, attribute extractor 112 may be configured to request a certificate for an entity, e.g., from a certificate system 180. In some implementations, the certificate complies with a standard. For example, the certificate may be a Verified Mark Certificate (VMC), that complies with a standardized certificate profile that allows companies to request certification of digital resources, including an email domain, a registered trademark, a web page, etc., as owned by the entity. VMC enables the use of other standards such as Brand Indicators for Message Identification (BIMI) that enables the display of logos and other identifying information in messaging applications after various specified email authentication methods are performed. Once the digital resources are confirmed, e.g., by a representative of a certifying authority, a certificate may be provided to authenticate the information, e.g., from certificate system 180. For example, a consuming/requesting entity (such as the entity attribute system 110) can request a certificate for a particular entity and receive the certified information for the entity, e.g., the registered trademark in an image format, the email domain, the web page, etc. In some implementations, the certificate does not comply with a standard. For example, the certificate may represent information from a user profile entered by the user and maintained at certificate system 180.

The attribute extractor 112 may request certificates for one or more entities. In some implementations, the attribute extractor 112 may request a certificate in response to a request for an information card for an entity. In this implementation, the attribute extractor 112 may issue a request for a single entity. In some implementations, the attribute extractor 112 may be configured as a batch process, e.g., requesting certificates for a group of entities, e.g., all entities, entities with certain attributes, entities in a specified group, etc. In such an implementation, the attribute extractor 112 may be configured to update the entity repository 140 with information obtained using the certificates returned in response to the request.

After receiving a certificate for an entity, the attribute extractor 112 may identify a web page in the certificate information. In some implementations, the web page may be an organization's web page, e.g., including information about a business entity, a charitable organization, a political campaign, a school, etc. In some implementations, the web page may be a social media profile, e.g., describing a user. In such an implementation, the semantic web markup, also sometimes referred to as schema markup may indicate which attributes the user has designated for sharing or displaying in an information card, e.g., which social media platform the user desires to use for receiving messages, which phone number the user prefers to be contacted with, etc. Thus, in some implementations, the user may mark or identify attributes as sharable, and these attributes may be designated as such using metadata on the profile page, e.g., using semantic web markup. Thus, semantic web markup can include the markup identified at schema.org or proprietary (non-standard) markup.

The attribute extractor 112 may obtain the web page, e.g., web page 195 from server 190, and extract attributes for the entity from the web page. The web page 195 may include semantic web markup. The semantic web markup is metadata in a web page that identifies an entity and attributes for the entity. Because the web page has been certified as positively tied to the entity that is the subject of the certificate, the attributes identified on, and extracted from, the web page via the semantic web markup are of high quality and reliable. Put another way, the attributes are accurate, updated, and definitively tied to the entity in question. Thus, inaccuracies relating to inferences are decreased or eliminated. Without the certificate, an attribute extractor makes inferences, which may or may not be accurate. For example, for a business entity, the system 100 (e.g., search system 120), may crawl a web page and may infer that the web page relates to an entity, but these inferences may be wrong, This might be because the entity is ambiguous or because a different web page has conflicting attributes. For example, there may be many web pages that relate to one particular entity, but the system (e.g., the search system 120) may not know which of the web pages is authoritative (e.g., has accurate information about operating hours, lines of business, etc.) and so the system may make inferences about which attributes to trust. However, such inferences can result in inaccurate facts. The link between the entity and the web page in the certificate eliminates the inferences, making the information obtained from the web page highly reliable and therefore of high quality.

In some implementations, the attribute extractor 112 may update the entity repository 140. For example, the attribute extractor 112 may add the web page from the entity's certificate as an attribute for the entity in the entity repository 140. As another example, the attribute extractor 112 may add one or more attributes extracted from the web page as attributes for the entity in the entity repository 140. One or more of the attributes and/or the web page may be marked/tagged in the entity repository 140 as certified by the entity. This tag may provide a highest level of confidence that the fact is accurate and reliable. In some implementations, downstream processes (e.g., card API 115, query processor 126) can use this tag in ranking attributes, e.g., boosting a rank for certified attributes. In some implementations, the attributes tagged as certified may be replaced with new values extracted from the web page without further corroboration, streamlining a process that maintains the entity repository. For example, without the certified link between the web page and the entity, a process updating the entity repository 140 may not have certainty about the correct value for an attribute when presented with conflicting values and, therefore, may seek to corroborate the information. With the certified link, such a process can update the attribute values when the attributes are extracted from the web page with a high level of confidence. In some implementations, the attribute extractor 112 may pass the extracted attributes to a requesting process, such as card API 115.

The entity attribute system 110 may include card application program interface (API) 115. The card API 115 may be configured to accept requests for entity information cards. The card API 115 may be used by other systems, such as message system 130 and/or search system 120, to produce information cards for display to users. In some implementations, the card API 115 may request attributes from attribute extractor 112. In some implementations, the card API 115 may get attributes from the entity repository 140. In some implementations, only attributes marked as certified in the entity repository 140 may be used in the information card. In some implementations, the card API 115 may up-rank attributes marked as certified. In some implementations, certain types of attributes may not be included in the entity information card unless they are certified attributes, e.g., attributes extracted from a web page linked to an entity in the certificate from the certificate system 180.

The system 100 may include message system 130. The message system 130 may include one or more processors, an operating system, and one or more computer memories. In some implementations, the entity attribute system 110 and the message system 130 may be integrated into one system. In some implementations, the message system 130 may be remote and/or distinct from system 100. Message system 130 may be configured for sending messages between users. For example, message system 130 may be an email platform, a social media platform, a video sharing platform, or other networking platform. The message system 130 may call card API 115 to obtain an information card about an entity. For example, the message system 130 may be configured to show an entity information card in response to a user, e.g., a user of client(s) 170, hovering over a message or an activation area in the message. For instance, a message may be an email message from a sending entity. The email message may include an image representing the entity, e.g., a person's profile picture, a trademark image for the entity (e.g., identified in the certificate for the entity), a graphic with an initial or initials for the entity, or a photograph of the entity. When the user hovers over the activation area the message system 130 may display the entity information card. As another example, the message may be a social media post (original post, reply, comment, direct message, etc.) by a user or a company and the activation area may be a profile picture of the author of the post. The entity information card may include certified attributes for the entity. Because the entity information card includes certified attributes, the user may rely on the information, which improves the user experience and confidence in the message system 130. In some implementations, the certified attributes reduce network bandwidth because the user does not need to perform a separate search for the information, either to find the information or to confirm that the information is correct. Thus, implementations conserve network bandwidth. Some implementations may not include message system 130.

The system 100 may include a search system 120. The search system 120 may be one example of a search engine, which receives queries from users, e.g., using client(s) 170, and provides search results in response to the queries. The search system 120 may include one or more processors, an operating system, and one or more computer memories. Search system 120 may include modules that enable the search system 120 to receive and respond to queries. For example, the modules may include a query processor 126, and an indexing engine 127. Query processor 126 may receive queries from requestors, such as client 170, analyze the query to determine how to search indexes for entity repository 140 and/or document repository 150, and initiate the search of the indexes. Query processor 126 may also receive search results, compile and format the results, and determine what results to return to the requestor. Indexing engine 127 may include a web crawling engine that crawls documents available on the Internet, analyzes the content, and indexes the content, using known techniques. In some implementations, indexing engine 127 may use or be integrated with the entity attribute system 110. For example, in some implementations, the indexing engine 127 may be configured to identify certified web pages in the entity repository 140, schedule the web pages for crawling, and update the entity repository 140 with attributes extracted as part of the indexing process. Thus, the indexing engine 127 may ensure that any certified attributes stored in the entity repository 140 are updated on a regular basis. In some implementations, the update may include re-requesting the certificate from the certificate system 180, e.g., to ensure that the web page is still associated with the entity in the certificate. If the web page in the certificate has changed, the indexing engine 127 may update it, e.g., in the entity repository 140. In some implementations, aspects of the attribute extractor 112 may be incorporated into the indexing engine 127.

Search system 120 may include one or more servers that receive queries from a requester, such as client 170, and provide a result back to the requester. The search system 120 may be responsible for searching document repository 150, entity repository 140, and potentially other data sources to generate the results. Search results may include information from documents responsive to the query or information for entities responsive to the query. For example, the search system 120 may receive a query from a client, perform some query processing using query processor 126, and retrieve results from document repository 150 and/or entity repository 140. The query processor 126 may obtain search results from the various sources and provide the compiled results 184 to client 170. In some implementations, the query processor 126 may provide one or more entity information cards as part of a result. In generating the entity information cards, the query processor 126 may up-rank attributes for entities responsive to the query that are certified attributes. In some implementations, certain attributes that are not certified are not included in an information card. For example, an email for contacting a business may not be provided unless the email is a certified attribute e.g., extracted from a web page related to the business in a certificate. In some implementations, aspects of the card API 115 may be incorporated into the query processor 126. Some implementations may not include search system 120.

System 100 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the system 100 (e.g., message system 130, search system 120, entity attribute system 110) may communicate with and transmit data to/from clients 170. The client 170 may be an example of a personal computing device, such as a personal computer, a laptop, a tablet, a smart phone, a smart watch, a smart TV, smart glasses, etc. Accordingly, the client 170 may include a processor 172 formed in a substrate, memory 173, and one or more applications, such as browser 175, in addition to input/output devices such as a touch screen, keyboard, display, camera, etc. The configuration of the example of system 100 is an example configuration and implementations may include other configurations not shown.

Figure 2:
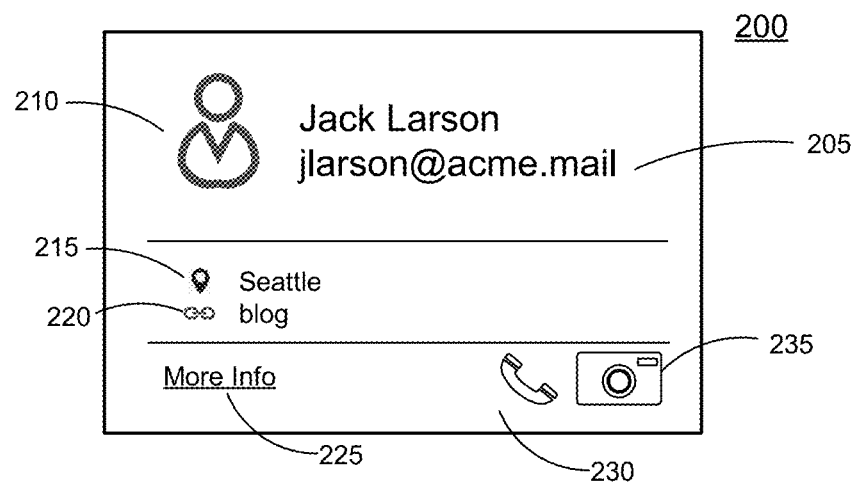
FIG. 2 illustrates example entity information cards, in accordance with some implementations.
Figure 2:
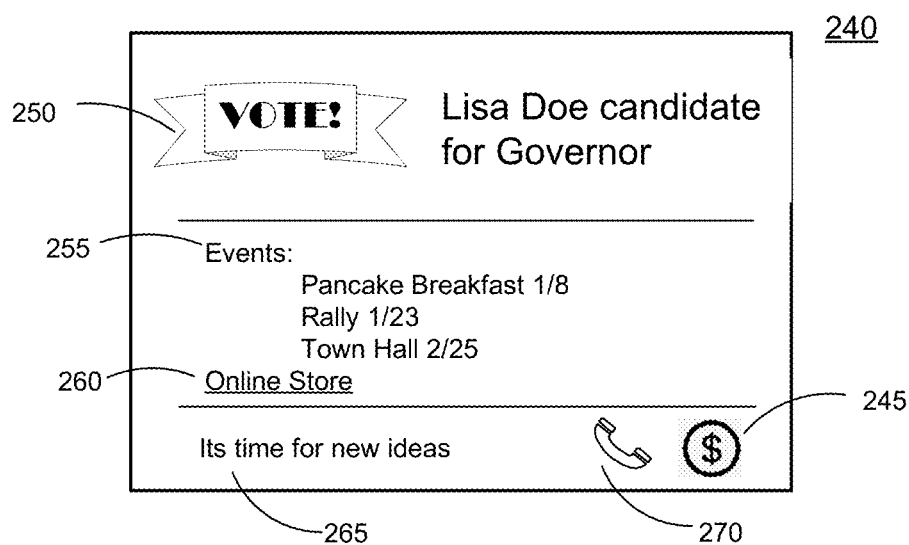

FIG. 2 illustrates example entity information cards 200 and 240, in accordance with some implementations. A system, such as system 100 of FIG. 1, may generate information used to display entity information cards 200 and 240. For example, entity information cards 200 and 240 may be generated as part of a search result for a query or in response to the user hovering over an activation area related to the entity (e.g., in an advertisement or message). In the example of entity information card 200 of FIG. 2, the entity relates to a person named Jack Larson. The entity information card 200 may have been generated, e.g., because a user has hovered over an activation area related to an email or other message (text message, SMS message, social media comment, social media post, etc.) sent by Jack Larson. In some implementations, the entity information card 200 may have been generated in response to a query identifying Jack Larson. The entity information card 200 includes an image 210, and a preferred contact email 205. The entity information card 200 also includes a location/hometown indicator 215 and a link to a blog 220 authored by Jack Larson. The entity information card 200 may also include an icon 230 that, when selected, initiates a phone call to Jack Larson, as well as an icon 235 that, when selected, takes the user to a preferred social media page selected by Jack Larson. In some implementations, the entity information card 200 may include a link 225 to the web page from which the attributes shown on the entity information card 200 were extracted. A user may have selected the image 210, the preferred contact email 205, the location/hometown indicator 215, the blog link 220, the phone number, and social media landing page as sharable attributes. Thus, the user maintains full control over what attributes are available for display in an entity information card for the user.

The example entity information card 240 in FIG. 2 is related to a political campaign entity. The entity information card 240 includes an image 250 associated with the campaign, a schedule of events 255, and a link 260 to an online store associated with the campaign. The entity information card 240 also includes a slogan 265, an actionable image 270 that, when selected, will initiate a phone call to the campaign, and an actionable image 245 that, when selected, may direct the user to a website for donating to the political campaign. In some implementations, some or all of the attributes in the information card 240 may have been extracted from an official campaign web page, which was linked to Lisa Doe's campaign by a certificate. In some implementations, the certificate may have been issued by a certificate authority (CA). In such implementations, the CA follows a profile such as a BIMI Verified Mark Certificate published by the AuthIndicators Working Group or other similar profile. In some implementations, the certificate may have been issued by a messaging platform. Although illustrating a political campaign, similar concepts could apply to a celebrity, e.g., a certificate could link a celebrity to a web page from which attributes about the celebrity are extracted. A CA can provide a high assurance of validity for entities. For example, a CA can match an applicant representative to a company owning a registered trademark and to a web page for the company. As another example, a CA can match an applicant representative to a person's identity or to a company or organization they own or represent, and to a web page representing the applicant. Likewise, a CA can match an applicant representative to a company or organization that owns that web page.

FIG. 3 illustrates example corporate entity information cards 300, 330, and 365, in accordance with some implementations. A system, such as system 100 of FIG. 1, may generate information used to display entity information cards 300, 330, and 365. For example, entity information cards 300, 330, and 365 may be generated as part of a search result for a query or in response to the user hovering over an activation area related to the entity. In the example of entity information card 300 of FIG. 3, the entity relates to a business, Fred's Bakery. The entity information card 300 includes the name of the business, the address 302 of the business, and a logo 305 associated with the business. The logo 305 may have been included in the certificate, along with the web page from which the address 302, operating hours 310, phone number and menu link 315 are extracted. The presence of the logo 305 in the certificate indicates that the logo has been verified as belonging to the entity. In some implementations, the entity information card may include a selectable icon 320 that initiates a phone call to Fred's Bakery when selected. The entity information card 300 may also include a selectable icon 325 that takes a user to the web page from which the attributes were extracted, when selected.

The example of entity information card 330 of FIG. 3 relates to a business, Acme, Inc. The entity information card 330 may have been generated in response to hovering over or selecting an actionable area of a message (email message, SMS message, text message) sent by Acme, Inc. The entity information card 330 includes attributes extracted from the message, as well as certified attributes extracted from a web page certified to be associated with Acme, Inc. For example, the entity information card 330 includes the name of the business, a general inquiry address 340 for the business, and a logo 335 associated with the business. As with entity information card 300, the logo 335 may have been included in the certificate for the entity. The certificate gives a high level of assurance that the information is correct, making the entity information card 330 more useful. The example entity information card 330 includes a phone number 345 and a customer service email address 350 extracted from the web page identified in the certificate. The entity information card 330 also includes an actionable icon 360 that may take the user to the web page from which the certified attributes were extracted. The entity information card 330 also includes a link 355 for tracking a package, which may have been extracted from the message. Thus, the entity information card 330 includes information extracted from the message as well as certified attributes. Information card 330 thus acts as a summary of important information from the message as well as attributes that might be of help to the user in following up on the message. In some implementations (not shown), the information card 330 may include an indication (icon, text) that the attributes on the card have been certified.

The example of entity information card 365 of FIG. 3 relates to an educational institution. The entity information card 365 may have been generated in response to hovering over or selecting an actionable area of a message (email message, SMS message, text message) sent by Bellevue County Schools, or in response to a query about Bellevue County Schools. The entity information card 365 includes uncertified attributes as well as certified attributes extracted from a web page certified to be associated with Bellevue County Schools. For example, the entity information card 365 includes the name of the educational institute, an administrative address 390 for the entity, a link to and name of the web page 370 certified to be associated with the entity, an actionable image 380 that initiates a phone call to a phone number extracted from the web page, and an actionable image 385 that initiates a message to an email address extracted from the web page. These attributes may be considered certified attributes, whereas the image and Wikipedia information link 375 may be attributes associated with the entity in an entity repository but not certified. Additionally, if a certified phone number was not identified on the web page, actionable image 380 may be left off of entity information card 365. Similarly, if an admin email was not extracted from the certified web page, the admin email may be left off of the entity information card 365, and replaced with another attribute. Put another way, certification may be used as a ranking signal to determine what attributes are included on an entity information card.

The entity information cards of FIGS. 2 and 3 are examples of entity information cards used for illustrative purposes only. Implementations are not limited to the format or information illustrated in the example entity information cards of FIGS. 2 and 3. For example, entity information cards may be generated in response to hovering over an advertisement, over a link in an email (e.g., using the email domain as a query to the certificate server), etc.

Figure 4:
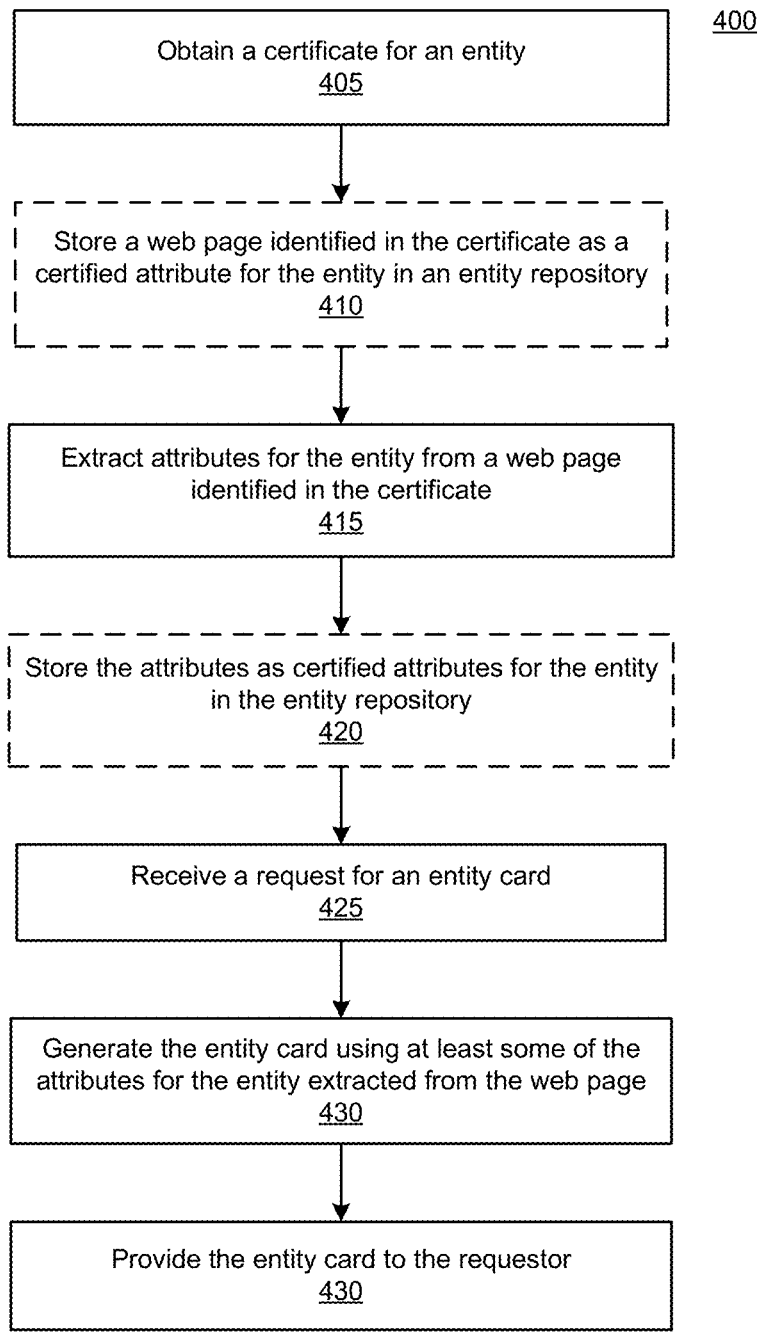
FIG. 4 illustrates a flow diagram of an example process for generating a certified entity information card, in accordance with some implementations.

FIG. 4 illustrates a flow diagram of an example process 400 for generating a certified entity information card, in accordance with some implementations. Process 400 may be performed by a system, such as system 100 of FIG. 1. While process 400 is described with regard to a single entity for ease of discussion, the system 100 may execute portions of process 400 for two or more entities concurrently.

Process 400 may begin by obtaining a certificate for an entity (405). The certificate may be from a certificate issuing service. The certificate includes a web page certified as being an authoritative and an accurate source of attributes for the entity. The certificate can follow a standard, such as the BIMI standard. The BIMI standard results in issuance of a VMC. A VMC includes, among other things, an email domain, an image file of a registered trademark, and a web page for an entity. Such a certificate may indicate that an entity has verified that the web page, the email domain, and the registered trademark are owned and maintained by the entity. In some implementations, the entity performs the verification via a manual process. In some implementations, the entity performs the verification automatically using, e.g., an Automated Certificate Management Environment (ACME) protocol. In some implementations, the entity performs the verification via a combination of manual and automated processes. This protects against phishing, spoofing, and spam attacks in a messaging environment. Another example of a certificate may be a certificate for a user profile, e.g., from a social media or messaging platform. Such a certificate may indicate that the user has approved a web page as accurately describing the user. For example, the web page may be a social media user profile. The web page may include metadata indicating which attributes the user has approved for sharing or other preferences of the user. These are given as examples only, and implementations include other kinds of certificates and certificate issuing services. Put another way, any certificate that provides a high level of confidence in the link between an entity and the information in the certificate may be the certificate obtained at step 405.

In some implementations, the system may store the web page identified in the certificate as an attribute for the entity in an entity repository (410). This is optional and may be done to reduce the requests to a certificate service. In some implementations, the web page may be stored for certain entities or certain classes of entities but not for all entities. In some implementations, the web page may be stored for entities with a contract for a particular level of service. In some implementations, any entity with a certificate may have the web page identified in the certificate stored as an attribute of the entity in the entity repository. Step 410 is optional, and some implementations may not store the web page as an entity attribute. If the web page is stored as an attribute in the entity repository, in some implementations, the web page may be identified or flagged as certified. This provides a provenance for the web page and indicates that the association between the web page and the entity is trusted and reliable.

The system may extract attributes for the entity from the web page identified in the certificate (415). In some implementations, this may be done as part of a larger indexing process. For example, the system may include an Internet crawler that extracts information from web pages available over the Internet. The crawler may, subsequent to the web page being associated with the entity in the entity repository, crawl the web page during normal operation. In some implementations, extracting attributes for the entity may be done in response to receipt of the certificate. In other words, the system may crawl the web page and extract the attributes because a certificate was received. The web page may use semantic web markup to identify the attributes extracted. Semantic web markup adds metadata to a web page and helps identify text, images, etc. as entities, relationships between entities, attributes of entities, etc. Semantic web markup can be used by, for example, web crawlers, to confidently identify a web page or content of the web page as relating to a particular entity or entities. This reduces entity ambiguity. One example of semantic web markup, or schema markup, is explained in more detail, at for example, at https://en.wikipedia.org/wiki/Semantic_Web or www.schema.org.

A web page, identified in a certificate, that includes semantic web markup further reduces the inferences that a system extracting information from the web page may make. Put another way, the system need not make inferences about whether the content applies to a particular entity, whether the content is authoritative/reliable, and what attributes the content might represent (e.g., is an email for customer service, general inquiries, etc.). Thus, attributes extracted from a certified web page with semantic web markup are of highest reliability and quality. In some implementations, the web page may be a user profile, e.g., associated with a messaging or social media platform. Such a web page may be requested via an API provided by the platform and may include semantic web markup for the attributes that the user has approved to be shared in an information card. For example, the social media or messaging platform may provide an interface for a user to indicate what attributes the user is willing to have displayed on an information card. The attributes selected by the user may be marked with semantic web markup on the user profile page, so that the system can extract these attributes and use them in an information card.

In some implementations, the system may associate any attributes extracted from the web page with the entity in an entity repository (420). In some implementations, the attributes may be identified in the entity repository as certified, e.g., via a flag or association with the certified web page. This indication of certification may give a level of assurance that the information is accurate and correctly associated with the entity. If a value for an attribute has changed, the certification provides a level of assurance that the updated value can replace the prior value. In other words, unlike an inferred value, the certification means the system does not need to corroborate the new value. Thus, implementations simplify the process of maintaining the entity repository while also improving the accuracy and reliability of the entity attributes. This increases user trust in and reliance on the information provided by the entity repository. Step 420 is optional, as some implementations may not use or maintain an entity repository.

The system may receive a request for an entity card (425). In some implementations, this request may trigger the request for the certificate. In some implementations, the request for an entity card is wholly independent of the request for a certificate, e.g., the system obtains certificates, extracts attributes, and updates an entity repository independently of servicing requests for an entity card. In some implementations, the system may obtain the attributes from the web page in response to receipt of the request for the entity card, e.g., using the web page associated with the entity in the entity repository, if one exists, or from a certificate (step 405) if it does not. In other words, some implementations may perform step 415 in response to the request for an entity card, steps 405 and 410 having been previously performed. Some implementations may perform step 405 in response to the request. Some implementations may have performed steps 405 to 420 independently of the request for an entity card and the system may need only look for the attributes in the entity repository.

In response to the request, the system may generate an entity card using at least some of the attributes for the entity extracted from the web page identified in a certificate for the entity (430). As indicated above, the attributes may already be in the entity repository and marked as certified. The attributes may be extracted (415) from a web page associated with the entity in an entity repository and marked as certified (410), and/or the attributes may be extracted from a web page obtained in a certificate (405) and resort to an entity repository is unnecessary. The attributes selected for use in the entity information card may vary based on the purpose of the card, as illustrated with regard to FIGS. 2 and 3, although these are not exhaustive. The entity information card may also include other information, e.g., from other sources or from a message or advertisement associated with the request for the entity information card. The system may then provide the entity card to the requestor (430) for display on a client device. The user of the client device can have high confidence in the reliability of the attributes displayed on the information card because of the certification of the web page as associated with the entity and the use of semantic web markup to identify the attributes.

An example system 100, server 190, certificate system 180, and/or client 170 of FIG. 1 may be implemented in one of various forms of computing devices, such as laptops, desktops, workstations, personal digital assistants, cellular telephones, smart phones, tablets, servers, and other computing devices, including wearable devices. Such example devices may include a processor, memory, a storage device, and expansion ports connected via an interface. In some implementations, these computing devices may include a transceiver, a communication interface, a camera. and a GPS (Global Positioning System) receiver module, among other components, connected via the interface. Example computer devices may communicate wirelessly through a communication interface, which may include digital signal processing circuitry where necessary. Each of the components may be mounted on a common motherboard or in other manners as appropriate.

The processor can process instructions for execution within the computing device, including instructions stored in the memory or on the storage device to display graphical information for a GUI on an external input/output device, such as a display. The display may be a monitor, a flat touchscreen display, a heads-up display, glasses lens, TV, etc. In some implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The computing device may include a volatile memory unit or units, a non-volatile memory unit or units, or another form of computer-readable medium, such as a magnetic or optical disk. In some implementations, the memory may include expansion memory provided through an expansion interface. The computing device may include a storage device capable of providing mass storage, such as a floppy disk device, a hard disk device, an optical disk device, or a tape device, a flash memory or other similar solid state memory device, or an array of devices, including devices in a storage area network or other configurations. The storage device and/or the memory is referred to as a non-transitory computer readable medium. A computer program product can be tangibly embodied in such a computer-readable medium. The computer program product may also contain instructions that, when executed, perform one or more methods, such as those described above.

The computing device may include a high speed controller that manages bandwidth-intensive operations for the computing device or a low speed controller that manages lower bandwidth-intensive operations, or a combination of such controllers. An external interface may be provided so as to enable near area communication of computing device with other devices. In some implementations, a controller may be coupled to a storage device and an expansion port. The expansion port, which may include various communication ports (e.g., USB, Bluetooth, Ethernet, wireless Ethernet) may be coupled to one or more input/output devices, such as a keyboard, a pointing device, a camera, a microphone, a scanner, or a networking device such as a switch or router, e.g., through a network adapter.

In some implementations, the computing device may be implemented in a personal computer such as a laptop computer, a smart phone, a tablet, or a wearable computer. An entire system may be made up of multiple computing devices communicating with each other.

In some implementations, a computing device may be implemented as a standard server, or a group of such servers. For example, the computing device may include large-scale data processing devices, such as servers, blade servers, datacenters, mainframes, and other large-scale computing devices. The computing device may be a distributed system having multiple processors, possibly including network attached storage nodes, that are interconnected by one or more communication networks. Such a distributed computing system may include any number of computing devices, including a server or rack servers, mainframes, etc. communicating over a local or wide-area network, dedicated optical links, modems, bridges, routers, switches, wired or wireless networks, etc. In some implementations, each computing device may include multiple racks. Each rack may include one or more processors, such as processors. The processors may include data processors, network attached storage devices, and other computer controlled devices. In some implementations, one processor may operate as a master processor and control the scheduling and data distribution tasks. Processors may be interconnected through one or more rack switches, which may handle communications between multiple connected computing devices.

Each rack may include memory and mass storage, including volatile or non-volatile storage, such as network-attached disks, floppy disks, hard disks, optical disks, tapes, flash memory or other similar solid state memory devices, or an array of devices, including devices in a storage area network or other configurations. Memory and mass storage may be shared between multiple processors, multiple racks, or multiple computing devices and may include a computer-readable medium storing instructions executable by one or more of the processors. Memory may include, e.g., magnetic or optical disks, flash memory, cache, Random Access Memory (RAM), Read Only Memory (ROM), and combinations thereof. Memory may also be shared between processors. Data structures, such as an index, repository, or other data stores, may be stored, for example, across mass storage and memory. A computing device may include other components, such as controllers, buses, input/output devices, communications modules, etc.

An entire system, such as system 100, certificate system 180, or server 190, may be made up of multiple computing devices communicating with each other, and these may collectively be known as system 100, certificate system 180, or server 190. As another example, entity attribute system 110 or search system 120 may be one or more distributed computing devices. Furthermore, some of the computing devices may be located geographically close to each other, and others may be located geographically distant.

The components and configurations discussed, their connections and relationships, and their functions, are meant to be examples only, and are not meant to limit implementations of the inventions described and/or claimed in this document.

In another aspect a system can include at least one processor and memory storing instructions that, when executed by the at least one processor, cause the computing system to perform any of the methods or operations described.

In another aspect a tangible computer-readable storage medium having recorded and embodied thereon instructions that, when executed by one or more processors of a computer system, cause the computer system to perform any of the methods or operations described.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining a certificate for an entity, the certificate identifying a web page address, wherein the certificate is generated by a third party certificate authority after validating a registration of attributes for the entity, the attributes including at least two of a trademark registration, a brand logo, an email sending domain, or a brand name;
obtaining attributes for the entity from a web page associated with the web page address, the web page including schema markup identifying the attributes and indicating which attributes are designated for sharing based on metadata of the web page;
crawling the web page address;
adding the attributes to an entity repository, the attributes being added with an indication of certification by the entity;
generating an information card populated using at least some of the attributes that are designated for sharing; and
providing the information card to a client device, the client device displaying the information card.

2. The method of claim 1, further comprising:
storing the web page address as an attribute for the entity in an entity repository, the attribute for the web page address being marked with an indication of certification by the entity,
wherein the attributes for the information card are obtained from the entity repository.

3. The method of claim 2, further comprising:
crawling the web page address to obtain updated attributes; and
updating the entity repository with the updated attributes for the entity.

4. The method of claim 1, wherein the information card is generated responsive to a request from a client, the request being sent responsive to a hovering event occurring over an image identified in the certificate.

5. The method of claim 4, wherein the image identified in the certificate is a logo generated for an email from an email domain identified in the certificate.

6. The method of claim 4, wherein the image is a trademark image.

7. The method of claim 4, wherein the image is an image of a user from a user profile.

8. The method of claim 4, wherein the image includes an image of the entity.

9. The method of claim 1, further comprising:
receiving a query;
determining that the entity is responsive to the query; and
generating the information card as a response to the query.

10. The method as in claim 1, wherein the web page further includes semantic page markup.

11. An electronic apparatus, the electronic apparatus comprising:
memory; and
processing circuitry coupled to the memory, the processing circuitry being configured to:
obtain a certificate for an entity, the certificate identifying a web page address, wherein the certificate is generated by a third party certificate authority after validating a registration of attributes for the entity, the attributes including at least two of a trademark registration, a brand logo, an email sending domain, or a brand name;
obtain attributes for the entity from a web page associated with the web page address, the web page including schema markup identifying the attributes and indicating which attributes are designated for sharing based on metadata of the web page;
crawl the web page address;
add the attributes to an entity repository, the attributes being added with an indication of certification by the entity;
generate an information card populated using at least some of the attributes that are designated for sharing; and
provide the information card to a client device, the client device displaying the information card.

12. The electronic apparatus of claim 11, wherein the processing circuitry is further configured to:
store the web page address as an attribute for the entity in an entity repository, the attribute for the web page address being marked with an indication of certification by the entity,
wherein the attributes for the information card are obtained from the entity repository.

13. The electronic apparatus of claim 12, wherein the processing circuitry is further configured to:
crawl the web page address to obtain updated attributes; and
update the entity repository with the updated attributes for the entity.

14. The electronic apparatus of claim 11, wherein the information card is generated responsive to a request from a client, the request being sent responsive to a hovering event occurring over an image identified in the certificate.

15. The electronic apparatus of claim 14, wherein the image identified in the certificate is a logo generated for an email from an email domain identified in the certificate.

16. The electronic apparatus of claim 11, wherein the processing circuitry is further configured to:
receive a query;
determine that the entity is responsive to the query; and
generate the information card as a response to the query.

17. The electronic apparatus as in claim 11, wherein the web page further includes semantic page markup.

* * * * *